(12) United States Patent
Krüger et al.

(10) Patent No.: US 6,712,544 B2
(45) Date of Patent: Mar. 30, 2004

(54) DEVICE FOR CLAMPING TWO COMPONENTS IN A SPACED RELATIONSHIP

(75) Inventors: Norbert Krüger, Essen (DE); Edvard Rückert, Velbert (DE)

(73) Assignee: Witte-Velbert GmbH & Co. KG, Velbert (DE)

( * ) Notice: Subject to any disclaimer, the term of this patent is extended or adjusted under 35 U.S.C. 154(b) by 0 days.

(21) Appl. No.: 09/958,107

(22) PCT Filed: Feb. 1, 2002

(86) PCT No.: PCT/EP01/01049

§ 371 (c)(1),
(2), (4) Date: Jan. 16, 2002

(87) PCT Pub. No.: WO01/57406

PCT Pub. Date: Aug. 9, 2001

(65) Prior Publication Data

US 2002/0159829 A1 Oct. 31, 2002

(30) Foreign Application Priority Data

Feb. 3, 2000 (DE) .......................... 100 04 697

(51) Int. Cl.[7] .................................................. F16B 5/00
(52) U.S. Cl. .................... 403/408.1; 403/370; 403/373; 403/374.4; 411/58; 411/60.1
(58) Field of Search ................. 403/370, 371, 403/386, 388, 389, 408.1, 409.1, 373, 374.1–374.4; 411/57.1, 58, 60.1, 546

(56) References Cited

U.S. PATENT DOCUMENTS

| 2,447,299 | A | * | 8/1948 | Williams ................ 403/370 X |
| 3,316,798 | A | | 5/1967 | Johnson |
| 3,413,886 | A | | 12/1968 | Proctor |
| 3,468,091 | A | | 9/1969 | Gerhard |
| 4,367,053 | A | * | 1/1983 | Stratienko et al. .......... 403/371 |
| 5,288,191 | A | * | 2/1994 | Ruckert et al. ...... 403/409.1 X |
| 5,419,650 | A | * | 5/1995 | Hoshino .................... 403/370 |
| 5,895,189 | A | * | 4/1999 | Ruckert .................. 411/546 X |
| 6,071,036 | A | * | 6/2000 | Ruckert |
| 6,487,882 | B2 | * | 12/2002 | Trempala ................ 403/370 X |

FOREIGN PATENT DOCUMENTS

| DE | 2018108 | 11/1970 |
| DE | 8606008 | 4/1986 |
| DE | 8816423 | 8/1989 |
| DE | 3822622 | 1/1990 |
| DE | 19816053 | 10/1998 |
| DE | 19839710 | 3/2000 |
| EP | 0176663 | 4/1986 |
| GB | 2045377 A | * 10/1980 |

* cited by examiner

Primary Examiner—Lynne H. Browne
Assistant Examiner—Ryan M. Flandro
(74) Attorney, Agent, or Firm—Martin A. Farber

(57) ABSTRACT

A device (1) for connecting first and second components (2, 3) which lie at a spacing from one another by clamping by a spacer (7), which is disposed in a spacing region, and a clamping piece (15) which clamps the two components (2, 3) with respect to one another, the securing actuation of the clamping piece (15) initially displacing the spacer (7) from a spaced position to a bearing position with respect to the second component (3) and then fixing the device to the first component (2) by clamping elements (13) which move into engagement against the wall of an insertion cavity (6) of the first component (2), wherein the spreading elements (13) are associated with the spacer (7).

18 Claims, 12 Drawing Sheets

DEVICE FOR CLAMPING TWO COMPONENTS IN A SPACED RELATIONSHIP

FIELD AND BACKGROUND OF THE INVENTION

The invention relates to a device for connecting components which lie at a spacing from one another by clamping by means of a spacer, which is disposed in the spacing region, and a clamping piece which clamps the two components with respect to one another, the securing actuation of the clamping piece initially displacing the spacer from a spaced position to a bearing position with respect to the second component and then fixing the device to the first component by means of clamping elements which move into engagement against the wall of an insertion cavity of the first component.

A device of this type is known from EP 0 176 663.

The exemplary embodiment illustrated in FIGS. 19 and 20 of that document has a dowel which at the end side forms spreading arms which move apart when a bolt, which forms the clamping piece, is screwed into the internal thread of the dowel. The dowel has a left-hand external thread. A spacer is screwed onto this external thread. This spacer has a neck which can bear in a frictionally locking manner against the threaded shank of the bolt. If the bolt is fitted into the spacer through an opening in the second component and is turned to the right, the spacer rotates with respect to the thread and is displaced toward the second component until its end side moves into a stop position at that location. The securing screw then engages in the internal thread of the dowel and spreads the spreading elements against the inner wall of the insertion cavity.

Utility Model 86 06 008.2 has disclosed a spreading dowel which forms a spreading sleeve which can be fitted into a drilled hole There, the spreading sleeve is seated in an axially fixed and frictionally locking manner. At the insertion-side end, the spreading sleeve forms spreading arms which can be spread radially outward when a spreading body, which can be displaced by the securing screw, is pulled in there.

SUMMARY OF THE INVENTION

The invention is based on the object of further developing a device of the introductory-mentioned type in a manner which is advantageous for use.

The object is achieved by the invention wherein the spreading elements are associated with the spacer. According to this configuration, the spreading elements are dragged along when the spacer is displaced from the spaced position into the bearing position. Only when the spacer has reached the bearing position against the second component are the spreading elements spread apart. Advantageously, that part of the spacer which forms the spreading elements is formed by a sleeve. The spreading body can enter this sleeve. The sleeve displacement is effected by dragging along the spreading body when the clamping piece is actuated. The sleeve preferably has slots which extend in the axial direction. The slot interspaces form the spreading elements. The clamping piece used is preferably a bolt. However, it is also possible to use a rivet instead of the bolt, and this rivet can be fixed using a suitable tool by tension. The spacer is positioned in the insertion cavity in such a manner that it is rotationally fixed but slidably displaceable in the axial direction. The spacer may comprise a plurality of individual parts in the manner described above. However, it may also be of single-part form. The single-part configuration is preferably formed by a spreading sleeve. The insertion cavity may be formed by a piece of tube which is fixedly connected to the first component. However, this piece of tube may also be formed by a drawn-in section in the first component. In a refinement of the invention, it is also possible to provide for the piece of tube to form the inner lining of a drilled hole. It is then formed as an insertion part. In this case, the piece of tube may also be capable of being spread open. The insertion part may furthermore have teeth which project radially outward and by means of which it can fit in a frictionally locking, axial and rotationally fixed manner in the drilled hole. A lug may project radially inward from the insertion cavity. This lug can engage in a groove in the sleeve, so that as a result rotational securing is ensured. Rotational securing between sleeve and spreading body can be ensured in a similar way. The spreading body preferably has a conical spreading surface which comes to bear against a conical mating surface of the sleeve. The pin which rotationally secures the sleeve to the spreading body can also fix the spreading body to the sleeve. The mating thread of the clamping bolt may be formed either by the second component or by the spreading body. In a variant of the invention, it is possible to provide for the spacer to move into the bearing position with respect to the second component by means of a second spreading body which is arranged opposite the first spreading body. When the bearing position is reached, the second spreading body can still move slightly with respect to the sleeve, so that tightening of the clamping body leads to a reduction in the spacing. To allow such a reduction in the spacing when the clamping bolt is tightened, there is alternatively provision for the spacer to be able to deform when a clamping force is applied. For this purpose, it is suitable for the spacer to be formed as a clamping sleeve. To axially hold the spreading elements in the insertion sleeve, it is possible to provide for the cylindrical sleeve outer wall to be circumferentially fluted. To achieve an optimum spreading action, it is furthermore possible to make provision for slots to start from end sides of the sleeve in order to form the spreading elements. The slots extend to beyond the axial center of the sleeve, so that they overlap one another in terms of length in the axial direction.

BRIEF DESCRIPTION OF THE DRAWINGS

Exemplary embodiments of the invention are explained below with reference to appended drawings, in which:

FIG. 2 shows a sectional illustration of the first exemplary embodiment before the clamping bolt is screwed in.

DETAILED DESCRIPTION OF THE PREFERRED EMBODIMENT

Figure 1:
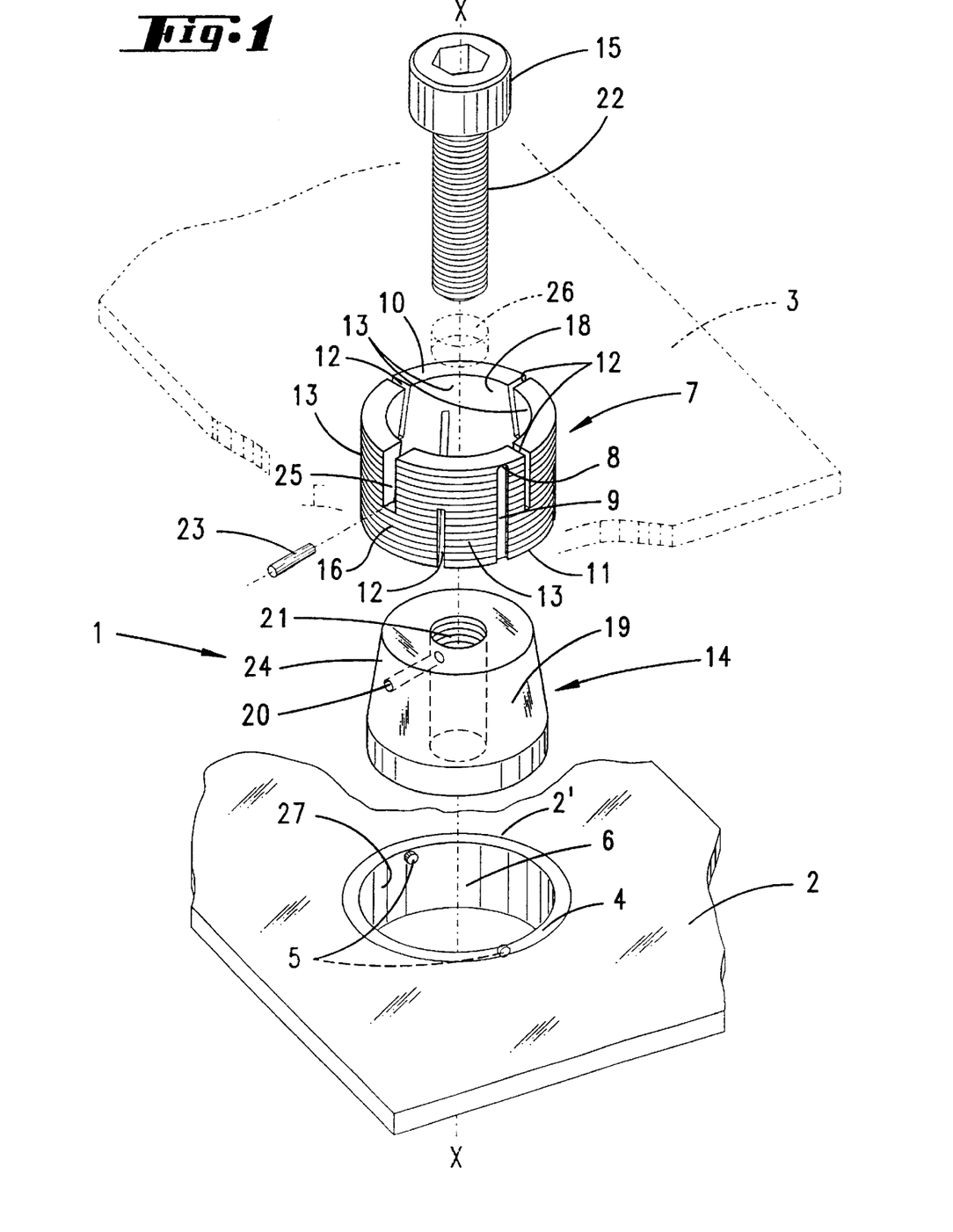
FIG. 1 shows an exploded view of a first exemplary embodiment.

In FIG. 1, the connecting device is denoted by the reference numeral 1 and includes a sleeve-like spacer 7, a spreading body 14 and a clamping piece 15. The clamping piece 15 is in the form of a bolt. The thread 22 of the bolt can be screwed into an internal thread 21 of the spreading body 14. The spreading body 14 has a conical lateral surface 19 and overall is in the form of a truncated cone with an acute apex angle. The spreading body 14 is provided so that its conical surface 19 can be fitted into the cavity of the spacer sleeve 7. The cavity of the spacer sleeve 7 forms a conically extending inner surface 18. The wall of the sleeve 7 is split by means of slots 12 extending in the axial direction. The regions which remain between the slots 12 form spreading elements 13 which are displaced radially outward when the spreading body 14 is pressed into the sleeve. The slots 12 open out in the direction of insertion of the spreading body 14.

Slots 12 which open out toward the opposite end side of the sleeve are also provided. In particular, this end side of the sleeve 7 has a widened slot 25. This is used to captively connect the spreading body 14, which has been inserted loosely into the cavity of the spacer 7, to the spacer sleeve 7. At the appropriate location of the lateral surface 19, the spreading body 14 has a transverse bore 20. A pin 23 is inserted into this bore 20 through the slot 25, so that the spreading body 14 cannot drop out of the sleeve 7.

The assembly comprising spreading body 14 and spacer 7 can be inserted into an insertion cavity 6 of the first component. The delimiting contour of the insertion cavity 6 corresponds to the outer delimiting contour of the spacer 7. In particular, the outer delimiting contour is an arc of a circle. However, the delimiting contour may also be of a form other than circular. In order, with a circular delimiting contour, to ensure rotational securing of the spacer sleeve lying in the insertion cavity 6, at least one lug 5 projects out of the lateral inner surface 27 of the insertion cavity 6. The lug 5 engages in a guide groove, which is closed on one end side and is open at the other end side, of the spacer 7. The closed side of the guide groove 9 forms a radial support wall 8, by means of which the spacer 7 is mounted on the lug 5 after it has been inserted into the insertion cavity 6. This is illustrated in FIG. 3

Figure 2:
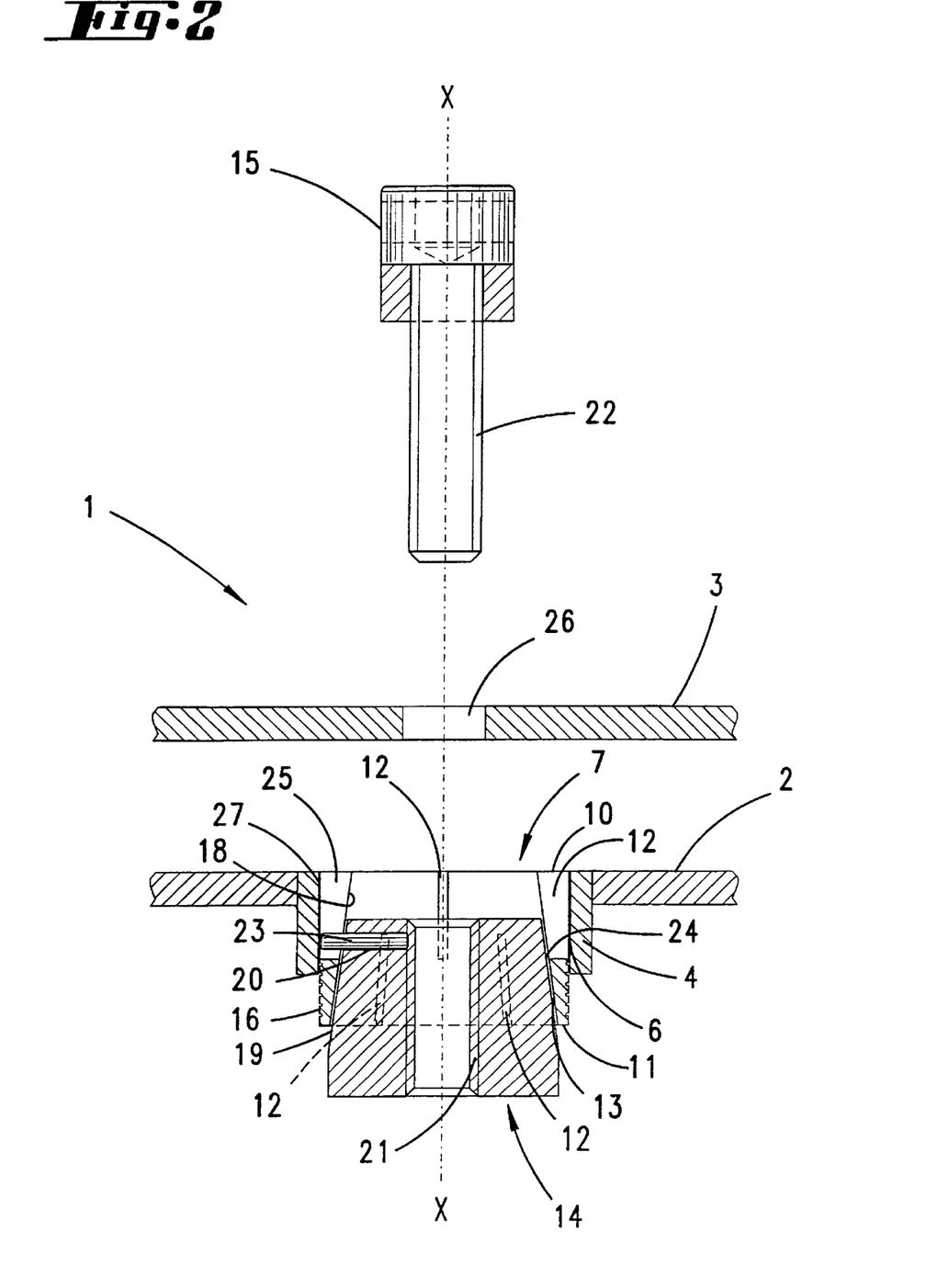

The insertion cavity 6 may be formed by a piece of tube 4 which is connected to the first component 2 in a suitable way. The first component 2 may be a piece of sheet metal. However, there is also provision, as illustrated by way of example in FIG. 8, for the insertion cavity 6 to be manufactured as a tubular drawn-in section by deformation of the metal sheet. As illustrated in FIG. 2, the two components 2, 3 which are to be connected to one another at a spacing are fitted together in such a manner that the passage bore 26 in the second component lies centrally with respect to the insertion cavity 6 and therefore also lies centrally with respect to the internal thread 21 of the spreading body 14.

Figure 3:
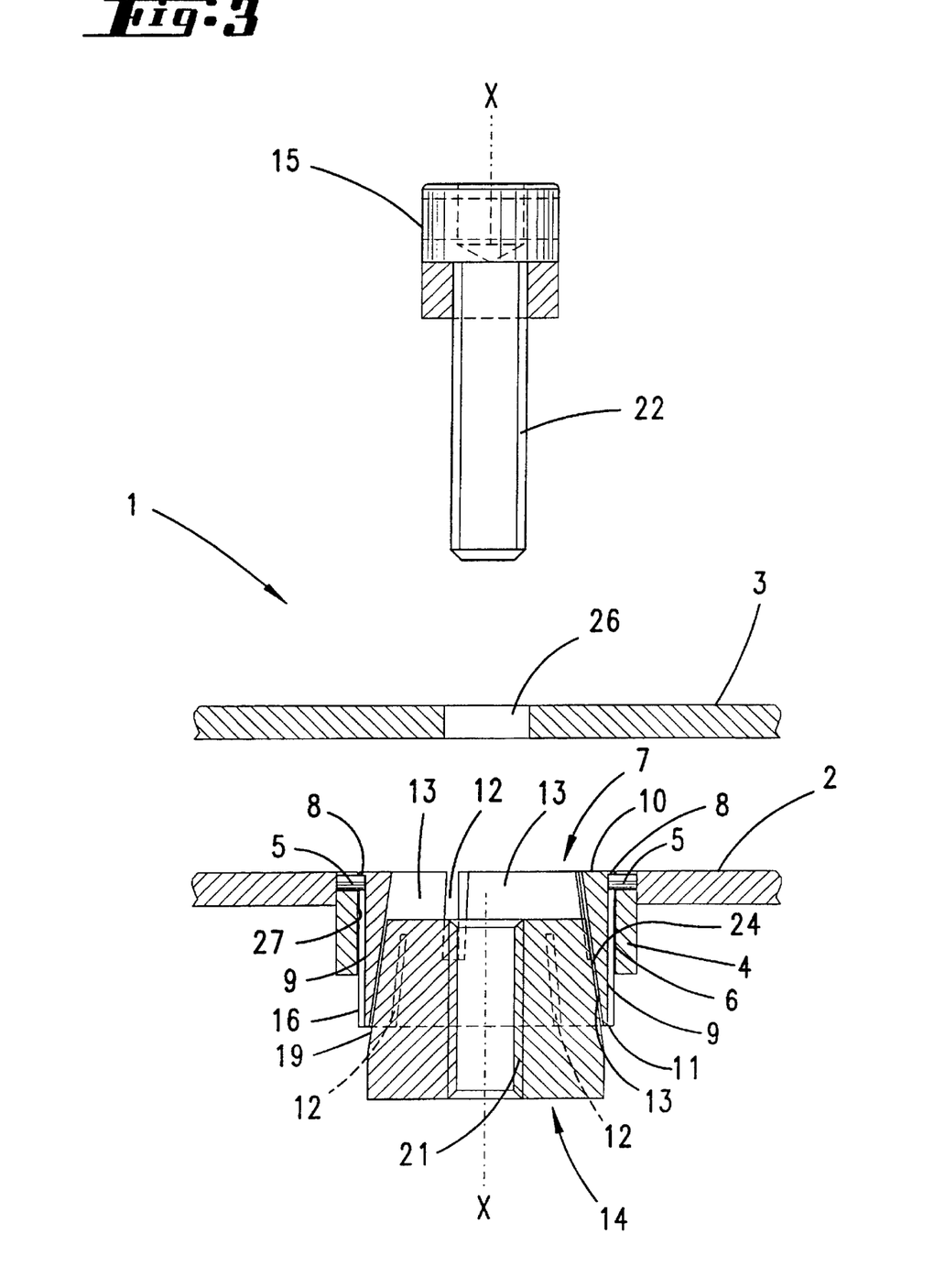
FIG. 3 shows an illustration as shown in FIG. 2 but rotated through 90°.
Figure 4:
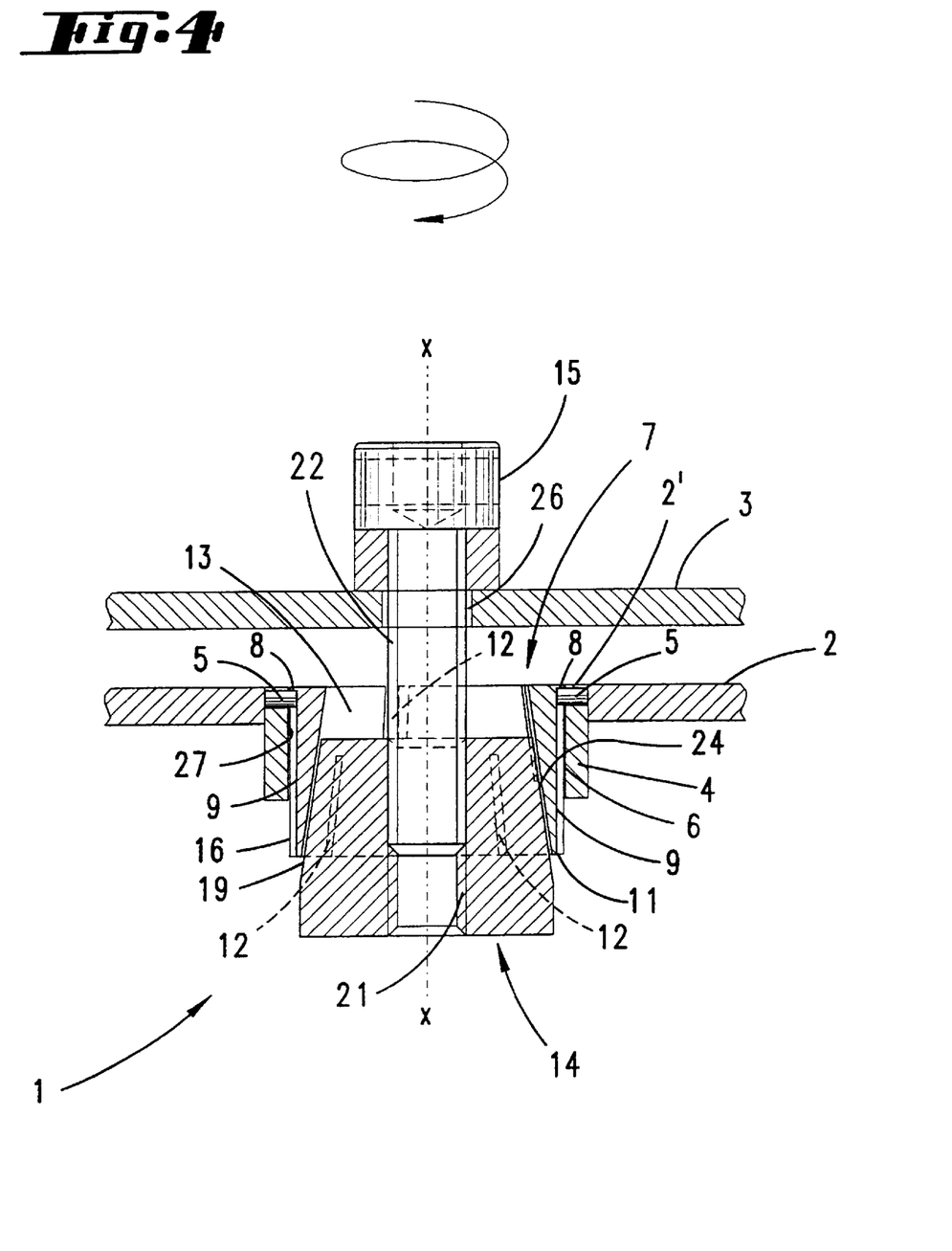
FIG. 4 shows an illustration as shown in FIG. 2 with the bolt screwed in loosely.

Starting from the preassembly position illustrated in FIGS. 2 and 3, a bolt 15 is then fitted through the passage bore (26) and its thread 22 is screwed into the internal thread 21 of the spreading body 14 until the screw head or an annular rubber buffer which forms a lining underneath the screw head comes to bear against the surface of the second component 3. This position is shown in FIG. 4.

Figure 5:
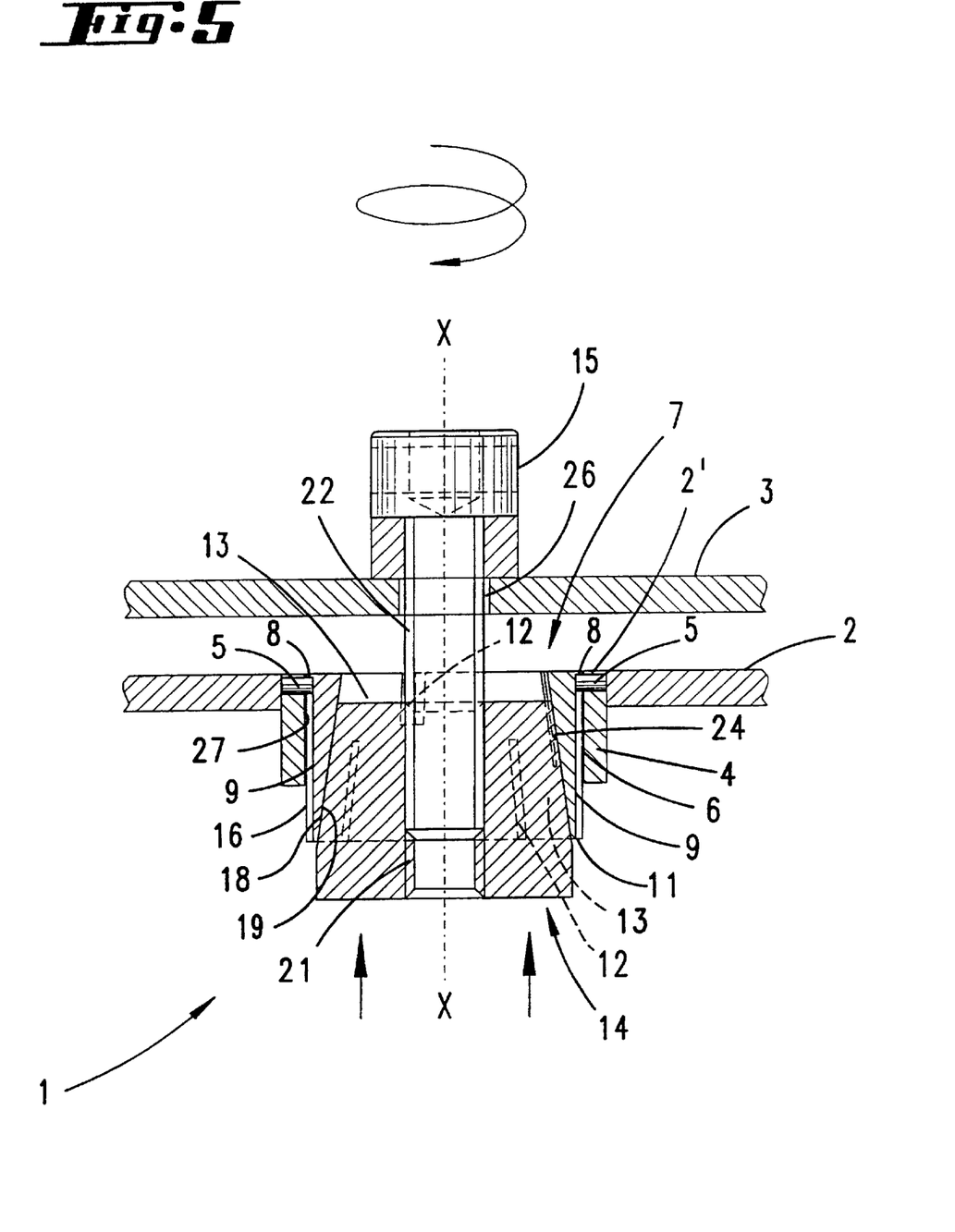
FIG. 5 shows a following illustration with the bolt tightened slightly.

If the bolt 15 is then screwed in further, the spreading body 14 is displaced in the axial direction until its conical lateral surface 19 comes into contact with the conical mating surface 18 of the spacer. This is illustrated in FIG. 5.

Figure 6:
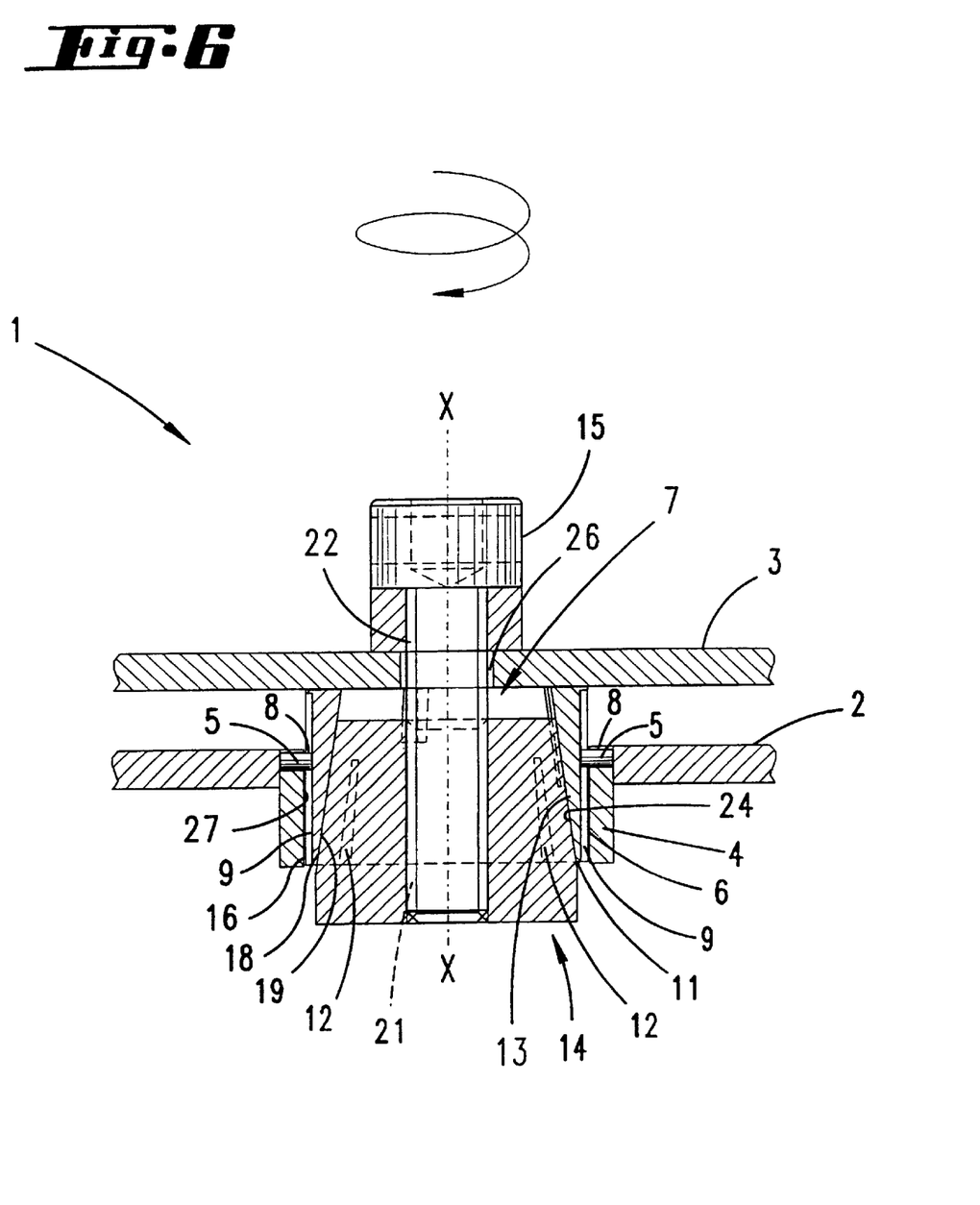
FIG. 6 shows a following illustration, in which the spacer has been displaced into the bearing position.

A further rotational displacement of the bolt 15 leads to further axial displacement of the spreading body 14. The latter takes the spacer with it, until its end face 10 comes into contact with the second component (cf. FIG. 6). Further turning of the bolt 15 leads to a further axial displacement of the spreading body 14, but without the spacer 7 being dragged with it. The conical lateral surface 19 slides over the conical mating surface 18 and leads to the spreading elements 13 which are formed between the grooves 12 being displaced radially outward and coming to bear with pressure against the inner surface 27 of the insertion cavity 6. In the exemplary embodiment, the outer wall of the sleeve 7 has a fluting 16, so that an improved frictional lock with respect to the inner lateral surface 27 is created.

Figure 7:
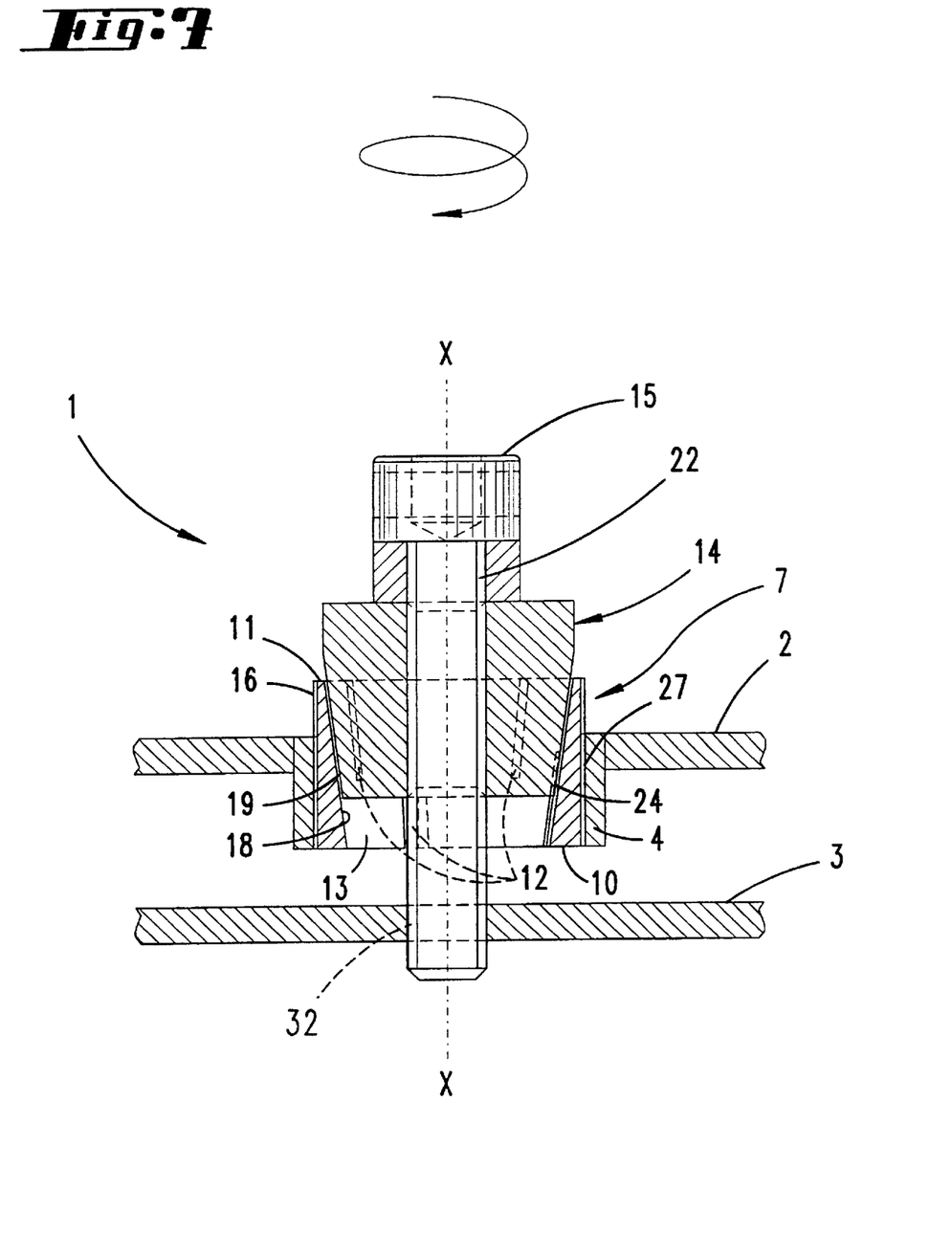
FIG. 7 shows a second exemplary embodiment of the invention in sectional illustration.

The exemplary embodiment illustrated in FIG. 7 differs from the exemplary embodiment described above substantially in that the spreading body 14 has a passage bore and no internal thread. Instead of the passage bore 26, the second component 3 has an internal thread 32. In the exemplary embodiment illustrated in FIG. 7, the head of the bolt 15 is displaced toward the second component during the screwing actuation. The bolt head 15 is seated on the base surface of the spreading body which fits in the spacer sleeve 7 and is displaced, as a result of rotation of the bolt 15, toward the second component 3, dragging the spacer 7 with it until the end face 10 comes into contact with the second component 3.

Figure 8:
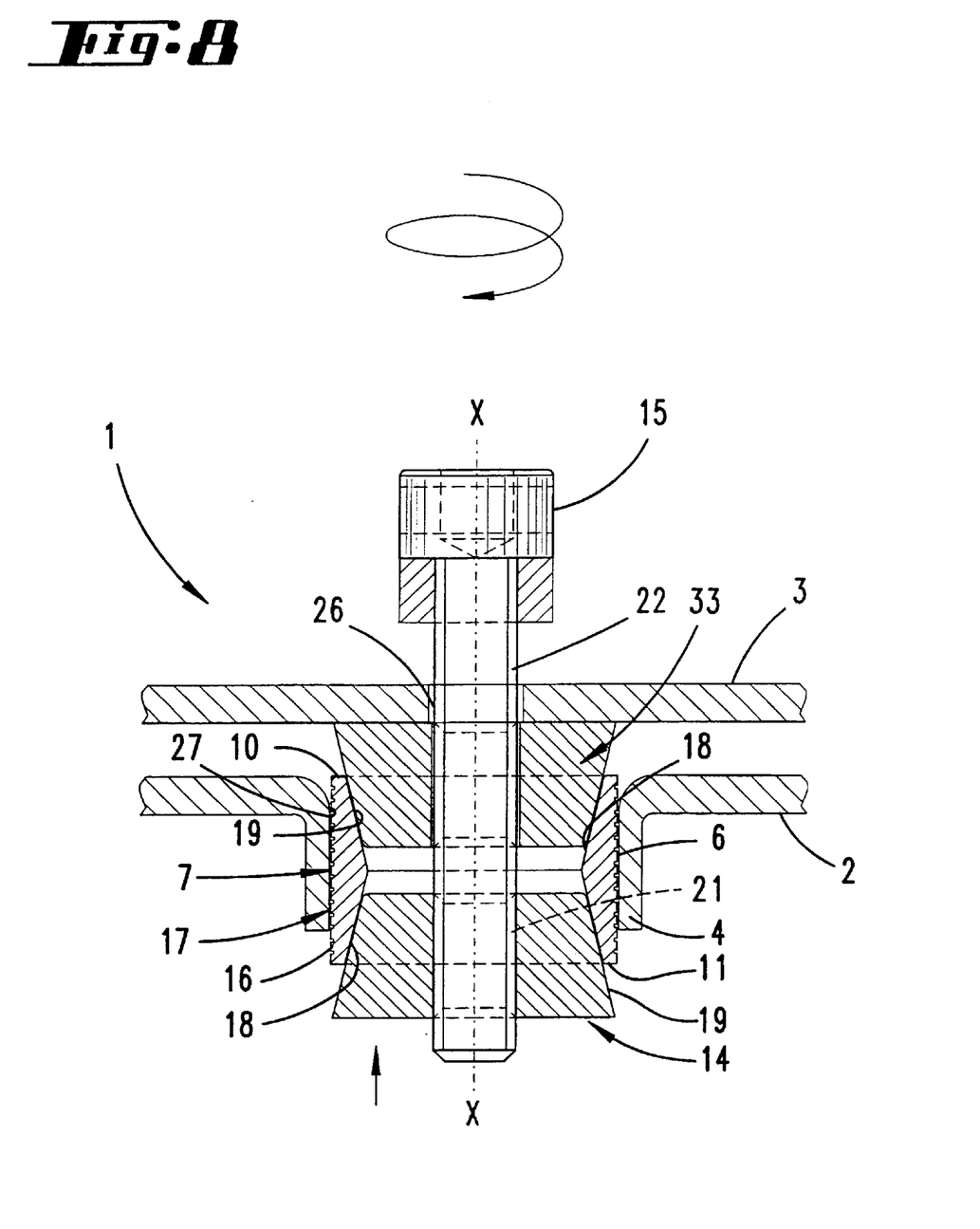
FIG. 8 shows a third exemplary embodiment of the invention in sectional illustration.

In the exemplary embodiment illustrated in FIG. 8, the spacer sleeve 7 has a second spreading body 33. This is arranged opposite the first spreading body 14, specifically in such a manner that the two conical lateral surfaces are directed with their points facing one another. The wide face of the second spreading body 33 faces the second component 3. The bolt 15 passes through a passage bore in the second spreading body 33. If the bolt 15 is screwed into the first spreading body 14, the second spreading body 33 is initially not displaced with it. The entire assembly comprising the two spreading bodies 14 and 33 and the sleeve 7 is displaced in the axial direction until the wide surface of the spreading body 33 comes to bear against the second component 3. Then, the first spreading body 14 is displaced further, carrying the spacer sleeve 7 with it, so that the spacing between the two wide surfaces of the spreading bodies 14, 33 is reduced. Since the second spreading body 33, during the clamping actuation, penetrates deeper into the sleeve 7 and, in the process, exerts a spreading action, the spacing between the two components 2 and 3 is reduced.

Figure 9:
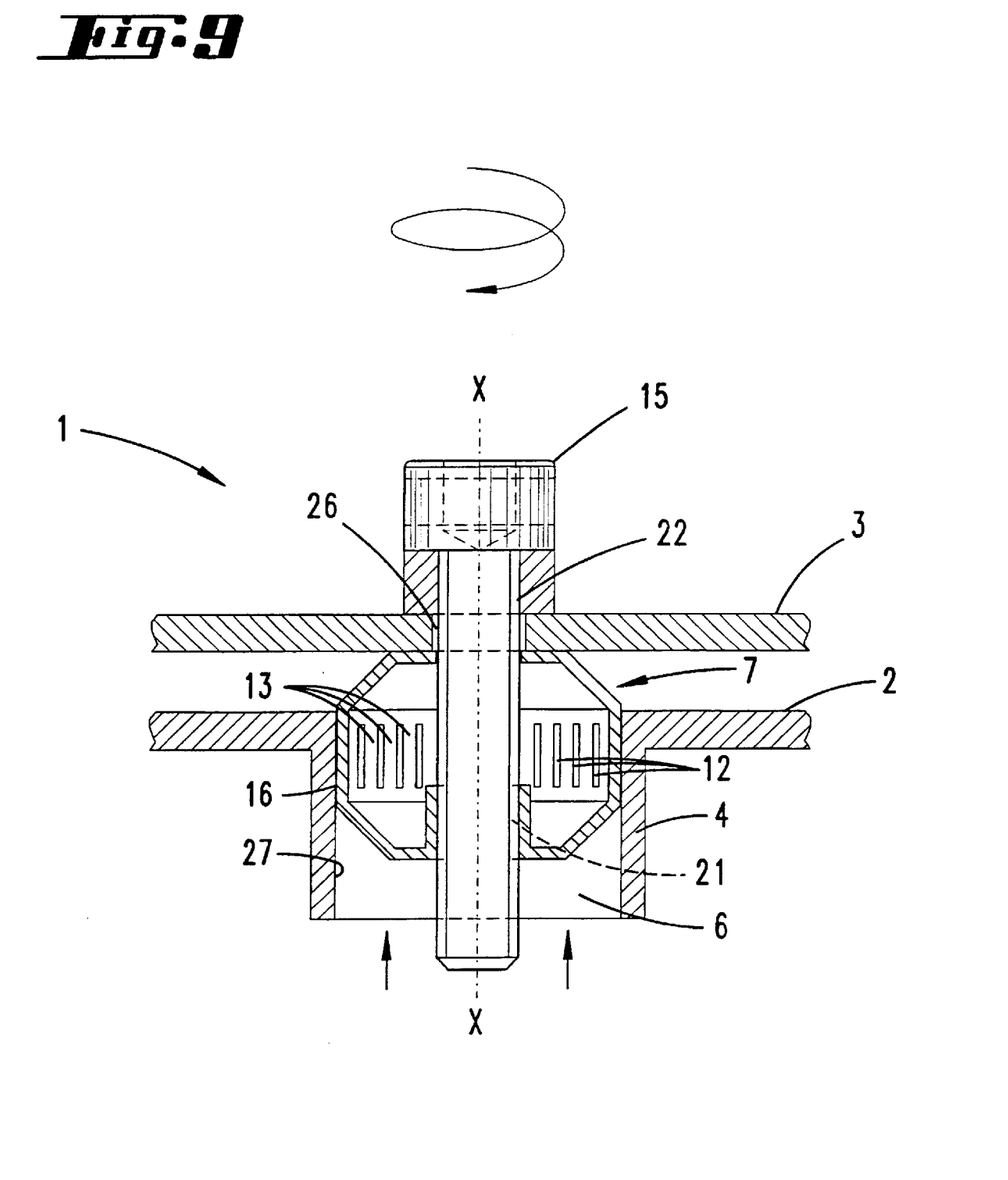
FIG. 9 shows a fourth exemplary embodiment of the invention with a single-part spacer and spreading element.

In the exemplary embodiment illustrated in FIG. 9, the element which effects the spreading action and the spacing is formed from one part. This is a spreading sleeve. This spreading sleeve comprises a passage opening which is associated with the upper end side and an internal thread 21 which is associated with the opposite end side. Conical sections, which merge into a central cylindrical section, lead from each of the two end sides. Overall, the spreading sleeve is of hollow form. The wall of the cylindrical section of the spreading sleeve has slots 12 extending in the axial direction. Spreading elements 13 are formed between the slots 12. If the upper end face of the spreading sleeve 7 comes into contact with the second component 3, the section of the spreading sleeve which forms the internal thread 21, when the bolt 15 is turned further, is displaced toward that section of the spreading sleeve which forms the passage opening, and this involves radial bulging of the cylindrical region, with the spreading elements 13 coming to bear against the inner wall of the insertion cavity 6, in order to be held in a frictionally locking manner there, with the slots 12 being spread open.

Figure 10:
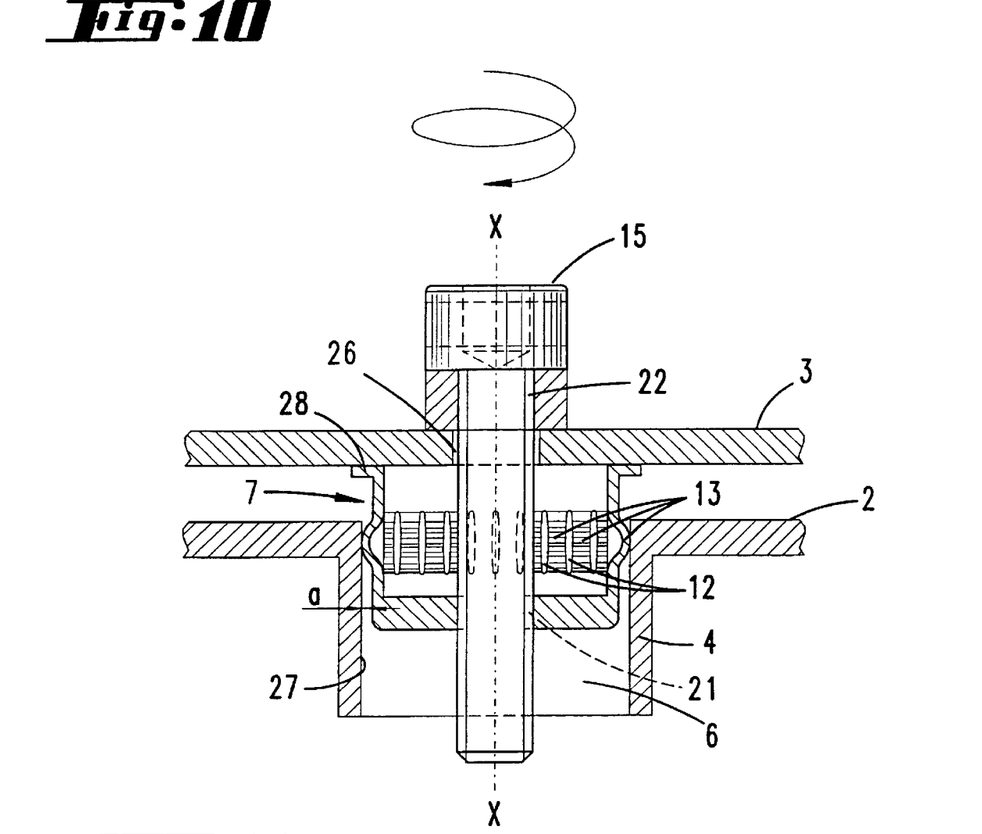
FIG. 10 shows a fifth exemplary embodiment of the invention.
Figure 11:
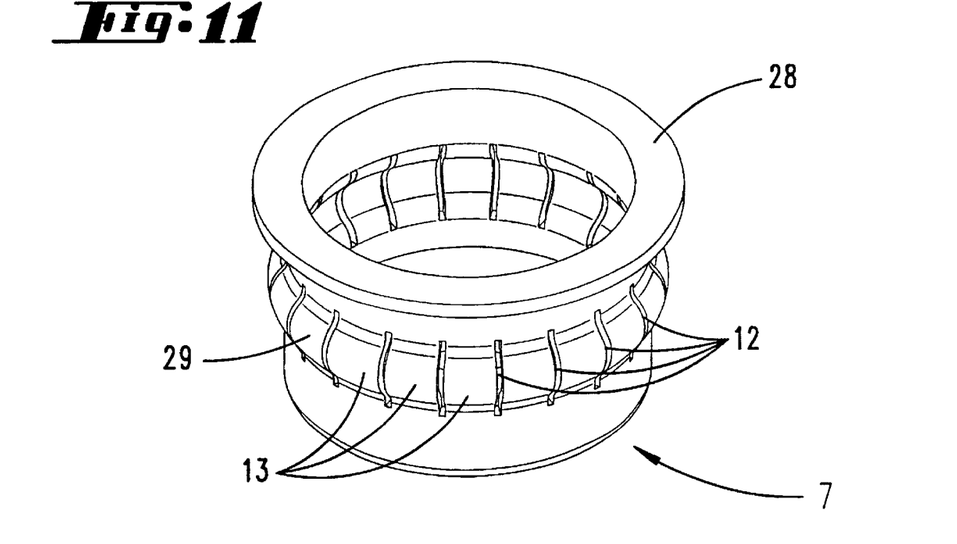
FIG. 11 shows the spacer and spreading body of the fifth exemplary embodiment.

The exemplary embodiment illustrated in FIGS. 10 and 11 is of similar construction. In this case, the spreading sleeve is of cup-like form, with a radially encircling collar 28 which forms the end face bearing against the component 3. From the radially encircling collar 28, the spreading sleeve 7 initially extends in cylindrical form until it reaches a central bead which forms the spreading zone. In the region of this bead, the spreading sleeve has a multiplicity of slots which extend in the axial direction and between which the spreading elements 13 are located. Following the bead-like section, the spreading sleeve once again continues in cylindrical form. At this location, it is at a spacing a from the inner wall 27 of the insertion cavity 6, so that greater tolerances can be used at this location. In the illustration of the exemplary embodiments, the two components 2, 3 lie in a parallel orientation with respect to one another. The spacing a in combination with the bead-like clamping section offers the possibility of the components 2, 3 also being tilted, i.e. of being connected at an angle to one another. The exemplary embodiment described below, which is distinguished by an axially short contact surface between cavity 4 and bead region 29, is particularly suitable for this purpose.

Figure 12:
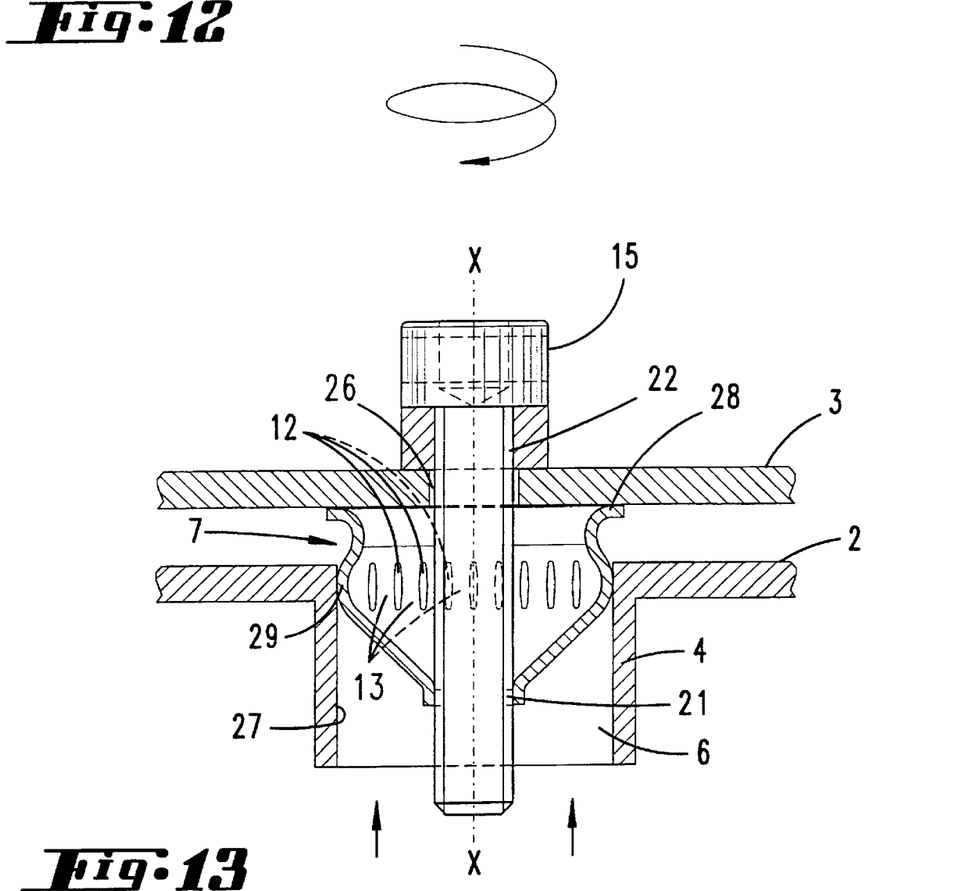
FIG. 12 shows a sixth exemplary embodiment in sectional illustration with spreading piece and spacer formed in cup form.
Figure 13:
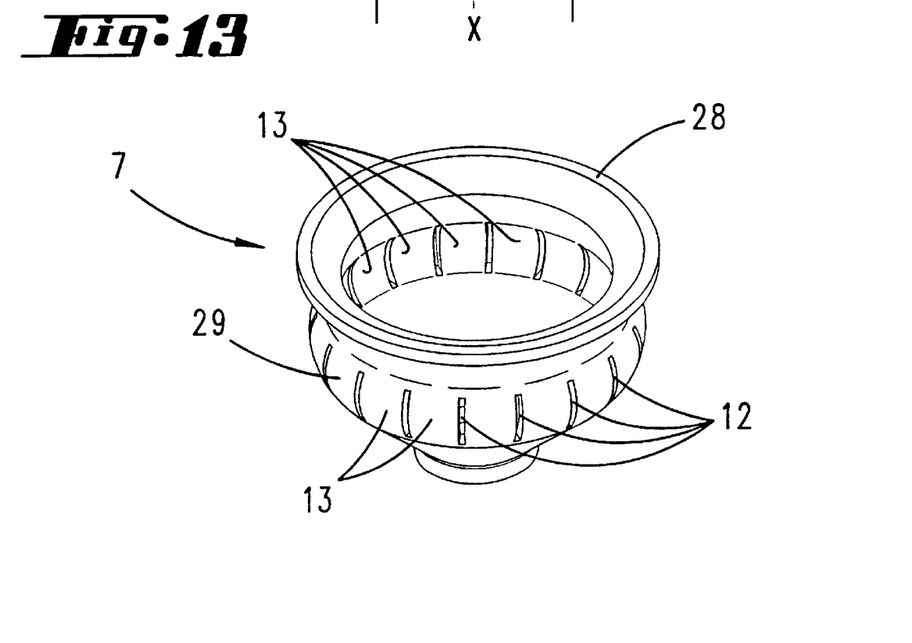
FIG. 13 shows the spreading piece and spacer of the sixth exemplary embodiment in a perspective illustration.

The exemplary embodiment illustrated in FIGS. 12 and 13 likewise has a spreading sleeve 7. This spreading sleeve also comes to bear against the second component 3 by means of a radially encircling collar. This spreading sleeve is in the shape of a bell with an internal thread 21 arranged in the region of the crown. From the internal thread 21, the spreading sleeve extends conically until it reaches the bead region 29 which is of larger diameter and in which spreading elements 13 are formed by axial slots 12.

Figure 14:
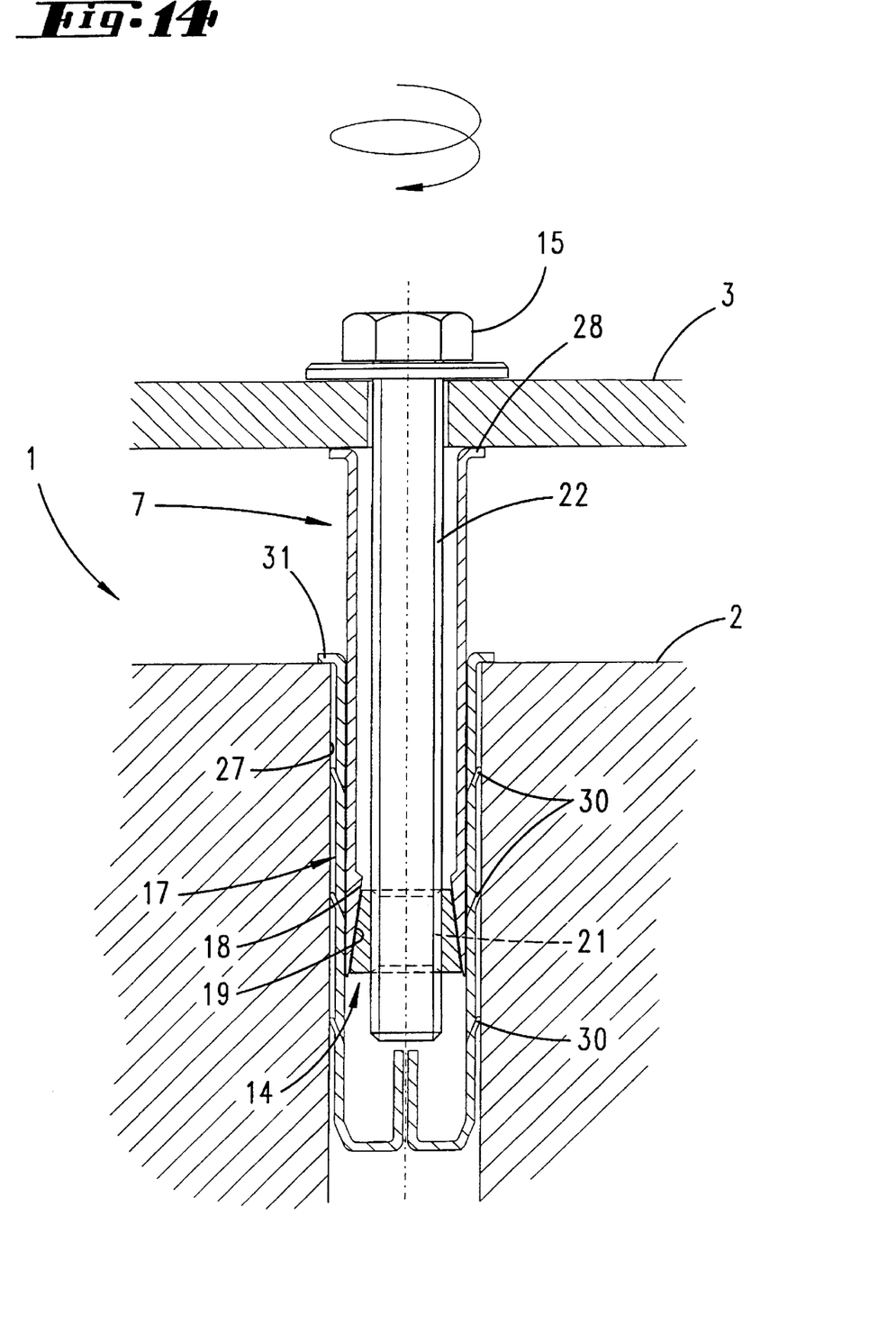
FIG. 14 shows a seventh exemplary embodiment of the invention.

The exemplary embodiment illustrated in FIG. 14 shows a connecting device in the form of a support for use in a drilled hole. In this exemplary embodiment, the spacer 7, which is likewise in the form of a sleeve but is elongate, fits into an insertion part 17. This insertion part 17 is likewise in the form of a sleeve and can be inserted in a drilled hole in a wall or the like. To ensure provisional axial and rotationally fixed connection between the insertion part 17 and the drilled hole of the first component 2, barb-like profiled lugs (30), which come into clamping-touching contact with the inner wall of the bore in the second component, project from the outer lateral surface of the insertion part 17.

The spacer sleeve 7 is fitted in the insertion part 17 in such a manner that it is rotationally secured but can be displaced in the axial direction. On its end face, this sleeve has a radially encircling collar 28 which, in the installed position, rests on a radially encircling collar 31 of the insertion part 17. When the bolt 15 is turned, the spreading body 14, which fits in the spacer 7 at the end side, is displaced toward the second component 3, the spacer being dragged with it until the collar 28 hits the component 3. There then follows a displacement of the spreading body 14 with respect to the spacer 7, the conical lateral surface 19, by sliding along the conical mating surface 18, pressing the spreading elements onto the inner wall of the insertion part. In the process, the wall of the insertion part is pressed further outward, so that the insertion part also spreads open and comes to bear in a frictionally locking manner against the inner wall of the bore in the first component 2.

We claim:

1. A device (1) for connecting first and second components (2, 3) which lie at a spacing from one another by clamping by a spacer (7), which is disposed in a spacing region, and a clamping piece (15) which clamps the two components (2, 3) with respect to one another, a securing actuation of the clamping piece (15) initially displacing the spacer (7) from a spaced position to a bearing position with respect to the second component (3) and then fixing the device to the first component (2) by spreading elements (13) which move into engagement against the wall of an insertion cavity (6) of the first component (2), wherein the spreading elements (13) are associated with the spacer (7), wherein the spacer (7) fits in the insertion cavity (6) in such a manner that it is rotationally fixed but slidably displaceable in an axial direction.

2. Device according to claim 1, further comprising a spreading body (14) which is displacable toward the second component (3) during the securing actuation and which drags therewith the spacer (7), which forms a sleeve, from the spaced position into the bearing position.

3. Device according to claim 2, wherein the spreading body (14), due to a pin (23) which engages in a groove (25) in the spacer (7), is seated in a rotationally fixed manner in the spacer (7).

4. Device according to claim 3, wherein the pin (23) holds the spreading body (14) on the spacer.

5. Device according to claim 2, wherein the spreading body (14) forms a conical lateral surface (19) which comes to bear against a conical mating surface (18) of the spacer (7).

6. Device according to claim 1, wherein the spacer (7) is provided with slots (12) which extend in an axial direction, slot interspaces forming the spreading elements (13).

7. Device according to claim 1, wherein the clamping piece (15) is a bolt or a rivet.

8. Device according to claim 1, wherein the spacer (7) is a spreading sleeve.

9. Device according to claim 1, wherein the insertion cavity (6) is formed by a piece of tube (4) which is fixedly connected to the first component.

10. Device according to claim 9, wherein the piece of tube (4) is formed by a drawn-in section.

11. Device according to claim 9, wherein the piece of tube (4) is formed by an insertion part (17) which is spreadable open.

12. Device according to claim 11, further comprising protuberances (30) which project radially from the insertion part (17), for holding the insertion part (17) in a rotationally and axially fixed manner in a drilled hole.

13. Device according to claim 1, wherein rotational securing is formed by a lug (5) which projects from the insertion cavity and engages in a groove (9) in the spacer (7).

14. Device according to claim 1, wherein a mating thread (21, 32) of a clamping bolt is associated with the second component (3) or with a spreading body (14).

15. Device according to claim 1, wherein the spacer (7) has a second spreading body (33), which is arranged opposite a first spreading body (14) and upon axial displacement, said second spreading body (33) comes to bear against the second component (3).

16. Device according to claim 1, wherein a substantially cylindrical sleeve wall (7) is circumferentially fluted (16).

17. Device according to claim 1, wherein slots (12, 25) which originate from both end sides of the sleeve, alternate with one another and overlap one another lengthwise in axial direction.

18. A device (1) for connecting first and second components (2, 3) which lie at a spacing from one another by clamping by a spacer (7), which is disposed in a spacing region, and a clamping piece (15) which clamps the two components (2, 3) with respect to one another, a securing actuation of the clamping piece (15) initially displacing the spacer (7) from a spaced position to a bearing position with respect to the second component (3) and then fixing the device to the first component (2) by spreading elements (13) which move into engagement against the wall of an insertion cavity (6) of the first component (2), wherein the spreading elements (13) are associated with the spacer (7), the spacer (7) has a second spreading body (33), which is arranged opposite a first spreading body (14) and upon axial displacement, said second spreading body (33) comes to bear against the second component (3) and wherein the spreading spacer (7), after coming into contact with the second component (3), is deformed, in such a manner as to reduce spacing, by increasing clamping force.

* * * * *

UNITED STATES PATENT AND TRADEMARK OFFICE
CERTIFICATE OF CORRECTION

PATENT NO. : 6,712,544 B2 Page 1 of 1
DATED : March 30, 2004
INVENTOR(S) : Norbert Krüger et al.

It is certified that error appears in the above-identified patent and that said Letters Patent is hereby corrected as shown below:

Title page,
Item [22], PCT Filed, correct "Feb. 1, 2002" to -- Feb. 1, 2001 --

Signed and Sealed this

Fourth Day of January, 2005

JON W. DUDAS
*Director of the United States Patent and Trademark Office*